(12) United States Patent
Whitlow et al.

(10) Patent No.: US 12,104,701 B1
(45) Date of Patent: Oct. 1, 2024

(54) RESILIENT METAL SEAL FOR CHECK VALVE

(71) Applicant: Technetics Group LLC, Charlotte, NC (US)

(72) Inventors: Mark Whitlow, Columbia, SC (US); Tony Smith, Lexington, SC (US); Charles Smith, Cassatt, SC (US); Jason Adams, Lexington, SC (US)

(73) Assignee: TECHNETICS GROUP LLC, Charlotte, NC (US)

( * ) Notice: Subject to any disclaimer, the term of this patent is extended or adjusted under 35 U.S.C. 154(b) by 0 days.

(21) Appl. No.: 18/496,561

(22) Filed: Oct. 27, 2023

Related U.S. Application Data

(63) Continuation of application No. 18/151,358, filed on Jan. 6, 2023, now Pat. No. 11,808,363, which is a continuation of application No. 17/341,377, filed on Jun. 7, 2021, now Pat. No. 11,549,591.

(60) Provisional application No. 63/047,506, filed on Jul. 2, 2020.

(51) Int. Cl.
*F16K 15/06* (2006.01)
*F16K 1/38* (2006.01)

(52) U.S. Cl.
CPC .............. *F16K 1/38* (2013.01); *F16K 15/063* (2013.01)

(58) Field of Classification Search
CPC .................................. F16K 1/38; F16K 15/063
See application file for complete search history.

(56) References Cited

U.S. PATENT DOCUMENTS

| | | |
|---|---|---|
| 1,234,096 A | 7/1917 | Farrell |
| 3,029,835 A | 4/1962 | Biello et al. |
| 11,549,591 B1 | 1/2023 | Whitlow et al. |
| 11,808,363 B1 | 11/2023 | Whitlow et al. |
| 2007/0193633 A1 | 8/2007 | Howell et al. |

*Primary Examiner* — P. Macade Nichols
(74) *Attorney, Agent, or Firm* — Husch Blackwell LLP

(57) ABSTRACT

A one-way valve is provided. The valve provides a housing with a through hole having an upstream portion and a downstream portion. The upstream portion has a reduced diameter compared to the downstream portion. The housing contains a valve seat. A valve member, or poppet, moves within the through hole from a valve closed position and a valve open position. A low pressure facing side of the poppet engages an elastic member of a compression member that biases the poppet in the valve closed position. A high pressure facing side of the poppet engages a resilient metal seal in the form of an annular disc, which may have a generally wavy or undulating shape. The outer ends of the resilient metal seal are curved to releasably engages the valve seat.

17 Claims, 8 Drawing Sheets

RESILIENT METAL SEAL FOR CHECK VALVE

CROSS-REFERENCE TO RELATED PATENT APPLICATIONS

This patent application is a continuation of U.S. patent application Ser. No. 18/151,358, filed Jan. 6, 2023, entitled "RESILIENT METAL SEAL FOR CHECK VALVE," which claims priority to U.S. This patent application is a continuation of U.S. patent application Ser. No. 17/341,377, filed Jun. 7, 2021, entitled "RESILIENT METAL SEAL FOR CHECK VALVE," which claims priority to U.S. Provisional Patent Application No. 63/047,506, filed Jul. 2, 2020, entitled "RESILIENT METAL SEAL FOR CHECK VALVE," the disclosure of which is incorporated herein by reference in its entirety.

BACKGROUND

The technology of the present application relates to valves and, more specifically, to a seal for a check valve, relief valve, or other one-way valve structure.

Conventional check valves have a seated or closed position and a lifted or an open position. Typically, the check valves are biased, such as by a compression spring, in a closed position against a seal (or seat). Fluid pressure against the valve provides a force that overcomes the biasing force to open the check valve and allow fluid to flow.

For the conventional check valve, the seal is frequently formed from relatively soft, resilient materials such as elastomer or polymer seals. In some instances, the seat that forms the seal is entirely formed of the elastomer or polymer. In other instances, the majority of the seat may be formed of a metal material where the interface between the piston and the seat.

FIG. 1 shows a cross sectional view of a conventional poppet check valve 100 (which also may be a relief valve) in the closed position. FIG. 2 shows the conventional poppet check valve 100 in the open (or lift) position. The check valve 100 has a housing 102 with a valve seat 104. The housing 102 has a through bore 106. The through bore has a first part 108, which is upstream, and a second part 110, which is downstream. The first part 108, in this exemplary embodiment, is a reduced diameter from the second part 110. The check valve 100 also has a valve element 112, or poppet 112, that engages the valve seat 104. The poppet 112 is biased towards the valve seat 104 by an elastic member 113, such as a coil spring or the like. The housing 102 and valve seat 104 have an annular channel 114 extending around the valve seat 104. An elastomer seal 116, such as an O-ring, or the like, resides in channel 114. When, as shown in FIG. 1, the valve element 112 engages the valve seat 104, the elastomer seal 116 forms a fluid media tight seal between the first part 108 of the through bore 106 and second part 110 of the through bore 108 (or between the upstream and downstream portions). Instead of an elastomer seal 116, the valve seat may be layered with an elastomer to form an interference between the valve seat and the valve element 112. In this case, the annular channel 114 may be removed as well.

The elastomer seal 116 (or layered elastomer, not specifically shown in FIGS. 1 and 2) are limiting. In particular, the elastomer seal 116 may fail or be less effective at higher operating temperatures as the elastomer seal 116 softens and/or creeps resulting in a less effective seal.

Thus, against this background, it would be desirable to provide an improved one-way valve.

SUMMARY

This Summary is provided to introduce a selection of concepts in a simplified form that are further described below in the Detailed Description. This Summary, and the foregoing Background, is not intended to identify key aspects or essential aspects of the claimed subject matter. Moreover, this Summary is not intended for use as an aid in determining the scope of the claimed subject matter.

In some aspects of the technology, a one-way valve is provided. The one-way valve may be, for example, a check valve, a relief valve, or the like. The one way valve in certain embodiments may be a poppet valve with a poppet. The valve provides a housing with a through hole. The through hole has an upstream portion and a downstream portion. The upstream portion has a reduced diameter compared to the downstream portion. The housing contains a valve seat, which typically has a taper. A poppet, or valve member, moves within the through hole from a valve closed position and a valve open position. The poppet has a high pressure facing side and a low pressure facing side opposite the high pressure facing side. The low pressure facing side of the poppet engages a compression member that biases the poppet in the valve closed position. The high pressure facing side of the poppet engages a resilient metal seal in the form of an annular disc. The annular disc has a generally wavy or undulating shape. The outer ends of the resilient metal seal are curved and provide a seat interface that releasably engages the valve seat. In the valve closed position, the seat interface sealing engages the valve seat. When the fluid pressure exceeds a predefined lift set point, the fluid pressure overcomes the biasing force of the compression member, and the poppet and the resilient metal seal lift putting the valve in the valve open position. When the fluid pressure drops below the predefined set point, the biasing force of the compression member moves the poppet and the resilient metal seal back to the valve closed position.

In some embodiments, the resilient metal seal is coupled to the high pressure facing side of the poppet. The coupling may be, for example, a weld, an adhesive, a rivet, a screw, a pin, or the like. In other embodiments, the resilient metal seal may be formed integral with the poppet.

As provided herein, the technology of the present application provides a one-way valve, such as a check valve, relief valve or the like, comprising a valve housing having a bore with a valve seat contained in the valve housing wherein the bore extends through the valve seat. A valve element is configured to selectively seat in the valve seat, the valve element having a high pressure facing side and a low pressure facing side. An elastic member operatively engaged with the valve element to bias the valve element to engage the valve seat. A metal seal is operatively connected to the high pressure facing side of the valve element, wherein the metal seal is has an annular seat interface that sealingly engages the valve seat.

In certain aspects, the seat interface the metal seal has a curved shape. Also, the metal seal may have a wavy or undulating shape to pre-load the seat interface.

In certain aspects, the one way may have a tapered valve seat. The tapered valve seat may, in certain embodiments, facilitate the sealing between the metal seal and the valve seat.

In certain embodiments, the metal seal is operatively connected to the high pressure facing side of the valve element via a weld, a fastener, or is integrally formed with the valve element. If a weld, the valve element may include a burr on the high pressure facing side to facilitate the weld build and the metal seal may include a perforation to accept the burr. If a fastener, the fastener may be a rivet, a screw, a pin, a bolt, an adhesive, or the like. If integrally formed, the metal seal may form an annular spring loaded curved seat interface.

These and other aspects of the present system and method will be apparent after consideration of the Detailed Description and Figures herein.

BRIEF DESCRIPTION OF DRAWINGS

Non-limiting and non-exhaustive embodiments of the present invention, including the preferred embodiment, are described with reference to the following figures, wherein like reference numerals refer to like parts throughout the various views unless otherwise specified.

DETAILED DESCRIPTION

The technology of the present application will now be described more fully below with reference to the accompanying figures, which form a part hereof and show, by way of illustration, specific exemplary embodiments. These embodiments are disclosed in sufficient detail to enable those skilled in the art to practice the technology of the present application. However, embodiments may be implemented in many different forms and should not be construed as being limited to the embodiments set forth herein. The following detailed description is, therefore, not to be taken in a limiting sense.

The technology of the present application is described with specific reference to a poppet check valve However, the technology described herein may be used with applications other than those specifically described herein. For example, the technology of the present application may be applicable to other one-way valves, relief valves, other lift type valves, or the like. Moreover, the technology of the present application will be described with relation to exemplary embodiments. The word "exemplary" is used herein to mean "serving as an example, instance, or illustration." Any embodiment described herein as "exemplary" is not necessarily to be construed as preferred or advantageous over other embodiments. Additionally, unless specifically identified otherwise, all embodiments described herein should be considered exemplary.

Figure 1:
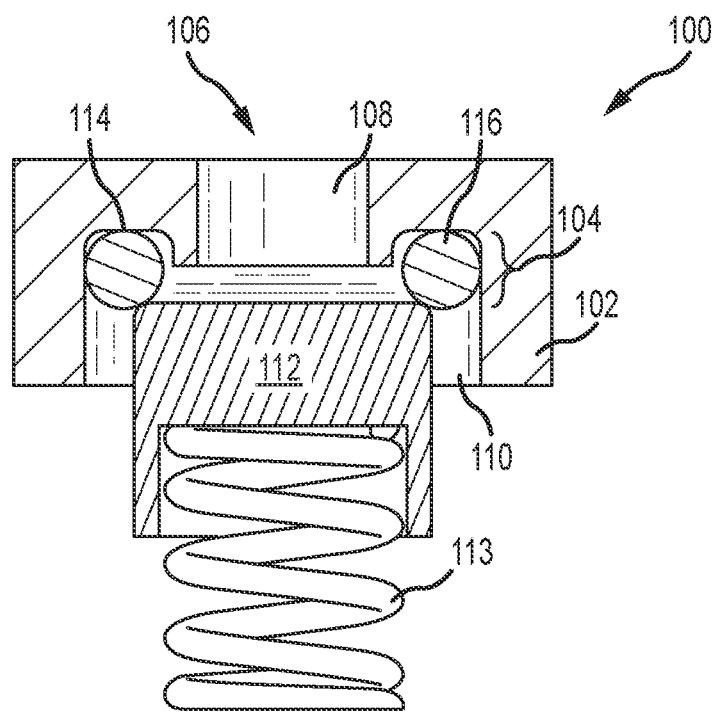
FIG. 1 shows a cross sectional view of a portion of a conventional poppet check valve.
Figure 2:
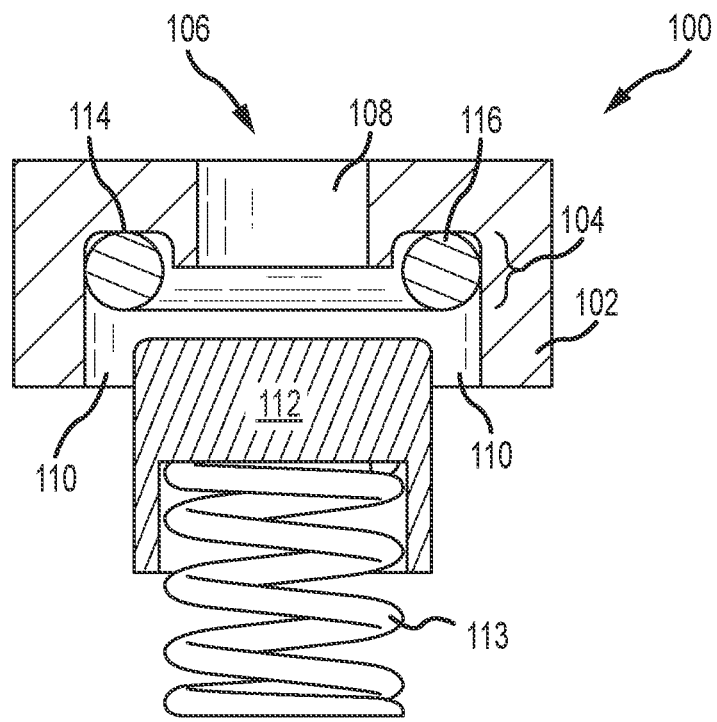
FIG. 2 shows a cross sectional view of a portion of a conventional poppet check valve.
Figure 3:
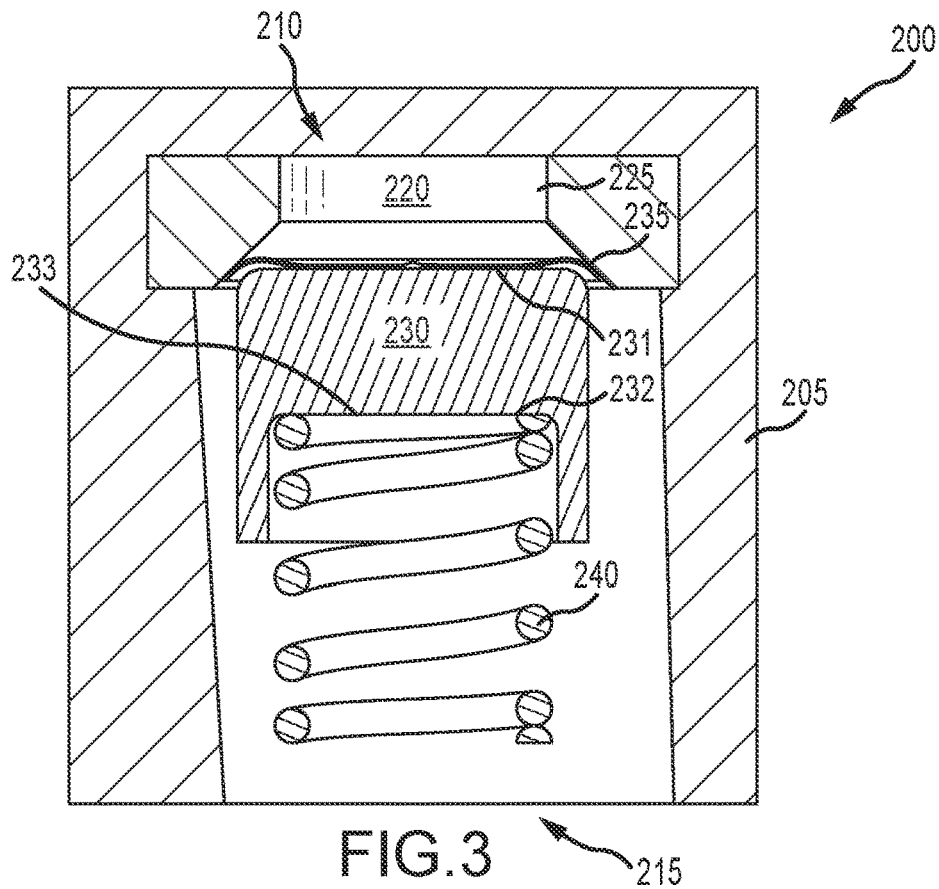
FIG. 3 shows a cross sectional view of a poppet check valve, resilient metal seal, and valve seat consistent with the technology of the present application.
Figure 4:
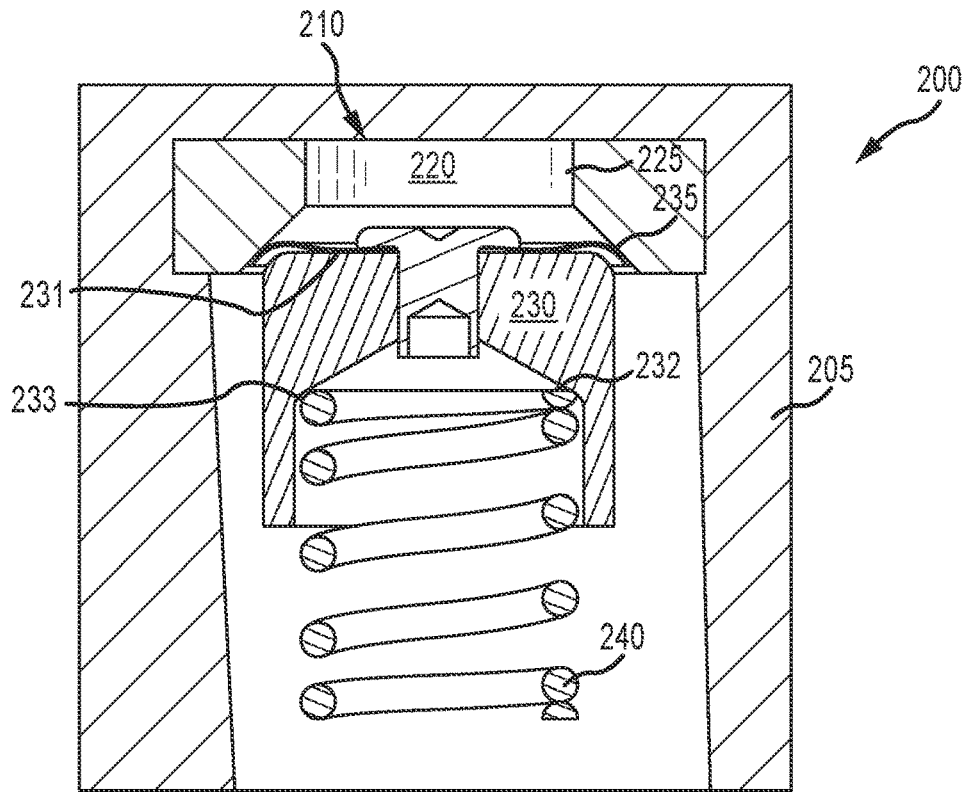
FIG. 4 shows a cross sectional view of a poppet, resilient metal seal, and valve seat consistent with the technology of the present application.

With reference now to FIGS. 3 and 4, cross sectional views of a poppet check valve 200 is shown in some detail to provide for an understanding of the technology of the present application. The poppet check valve 200 has a valve housing 205. The poppet check valve 200 is typically installed in a piping system for a fluid, which is not shown. The poppet valve has an input port 210 and a discharge port 215. The input port 210 is upstream and the discharge port 215 is downstream in the normal course. The housing 205 defines a through hole 220. The through hole 220 has a reduced diameter portion 225 proximate the input port 210.

A poppet or valve element 230 resides in the housing 205. The poppet 230 has a high pressure facing side 231 that engages with a valve seat 235. The low pressure facing side 232 of the poppet 230 comprises an abutment 233. The high pressure facing side is designated as high pressure facing as the pressure on the upstream side of poppet 230 has to overcome the spring force and any media tending to seat the poppet 230 to open, which requires at least a momentary high pressure. Reference to a high pressure side or a low pressure side should not be considered limiting or defining except when required by the context of the term. A compression element 240, such as the coil spring as shown, provides a biasing force tending to move the poppet 230 towards the valve seat 235.

Figure 5A:
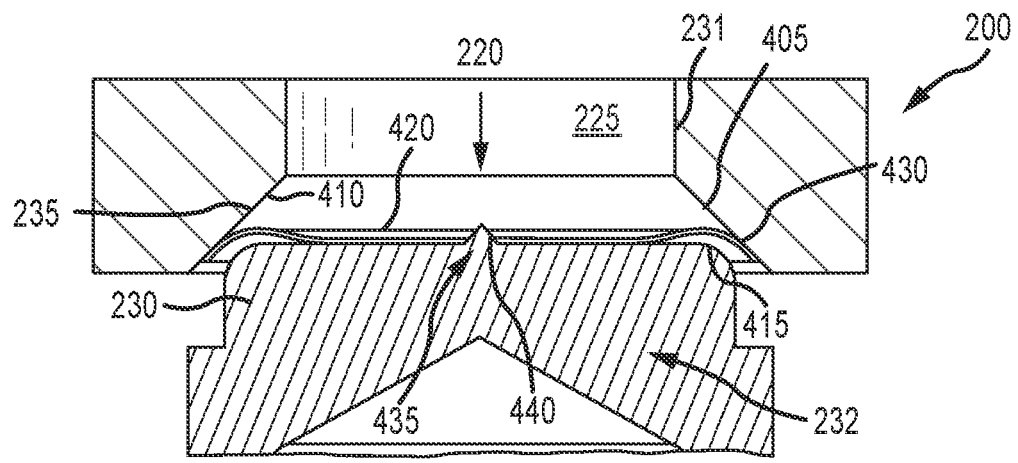
FIGS. 5a and 5b show cross sectional views of a poppet, resilient metal seal, and valve seat consistent with the technology of the present application.
Figure 7:
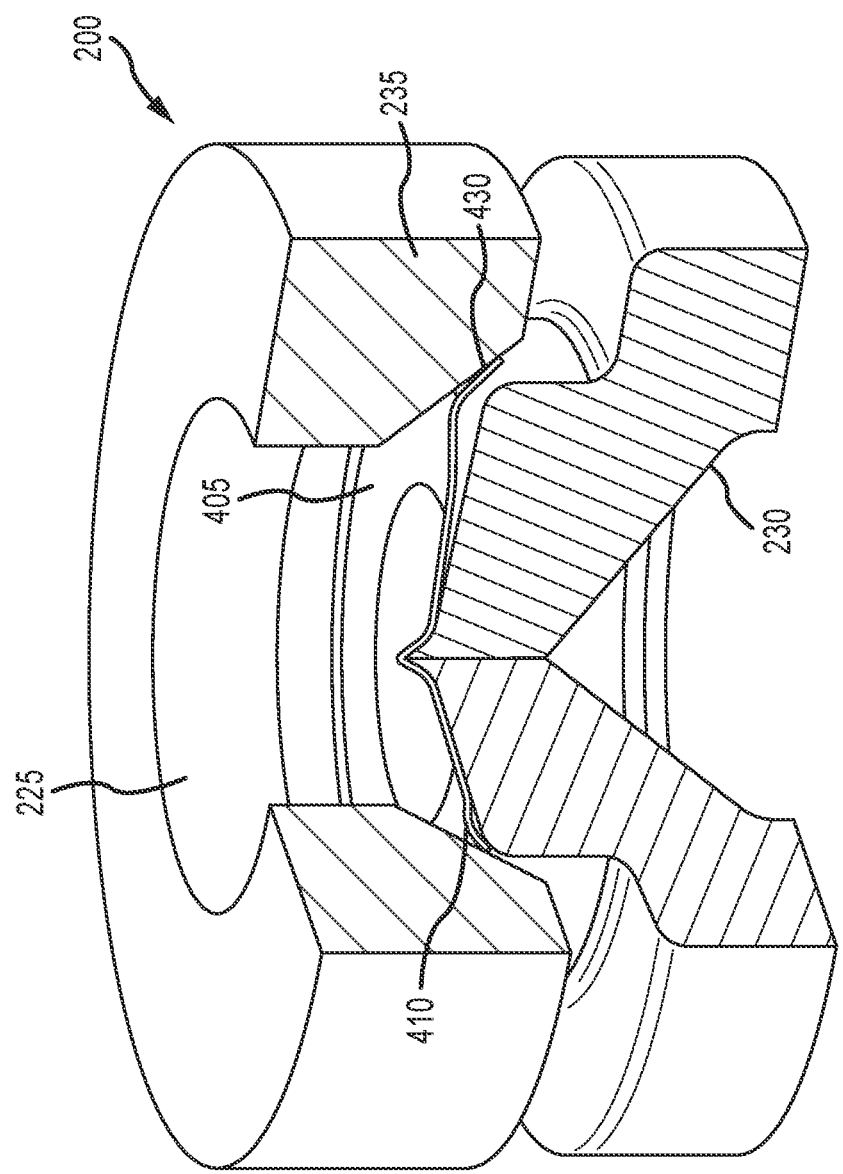
FIG. 7 shows a perspective view of the poppet, resilient metal seal, and valve seat consistent with the technology of the present application.

FIG. 5a shows a resilient metal seal 405 for the check valve 200 from FIG. 3 consistent with the technology of the present application. A perspective view of the resilient metal seal 405 in FIG. 5a is shown in FIG. 7. The valve seat 235 has a taper 410 located where the through hole 220 transitions from the reduced diameter portion 225. The poppet 230 has an outer perimeter 415 operatively shaped to engage the taper 410 of the valve seat 235. The poppet 230 has a high pressure facing side 231 and a low pressure facing side 232. The low pressure facing side 232 is designed to engage a compression element 240, not shown in FIG. 5a.

The resilient metal seal 405 is shown having a wavy or undulating shape 420, which facilitates the resiliency. In certain embodiments, the resilient metal seal 405 may have a generally planar shape where the outer annular perimeter has an arc or convex/concave shape. The resilient metal seal 405 has a curved portion at an outer end portion that forms a seat interface 430 that releasably engages the taper 410 of the valve seat 235. The seat interface 430 is sealingly coupled to the taper 410 to provide a fluid seal. The wavy or undulating shape 420 pre-loads the seat interface 430 to provide a seating and sealing force between the taper 410 and the seat interface 430. While shown with a taper 410, the technology of the present application functions such that a taper is optional in some instances.

The resilient metal seal 405 is coupled to the poppet 230 in a fluid impervious manner. The resilient metal seal 405 may be welded to the high pressure facing side 231 of the poppet 230. In this case, the high pressure facing side 231 of the poppet 230 may have a weld burr 435, shown here as a pyramid or frusto-conical shape. The weld bur 435 extends through an alignment perforation 440 in the resilient metal seal 405. While the weld bur 435 and alignment perforation 440 are shown located at about the geometric center of the poppet 230 and resilient metal seal 405, the location may be elsewhere. Also, there may be a plurality of weld locations with a plurality of burrs and perforations. A weld 440 would be built forming a fluid impervious couple between the resilient metal seal 405 and the poppet 230.

Figure 5B:
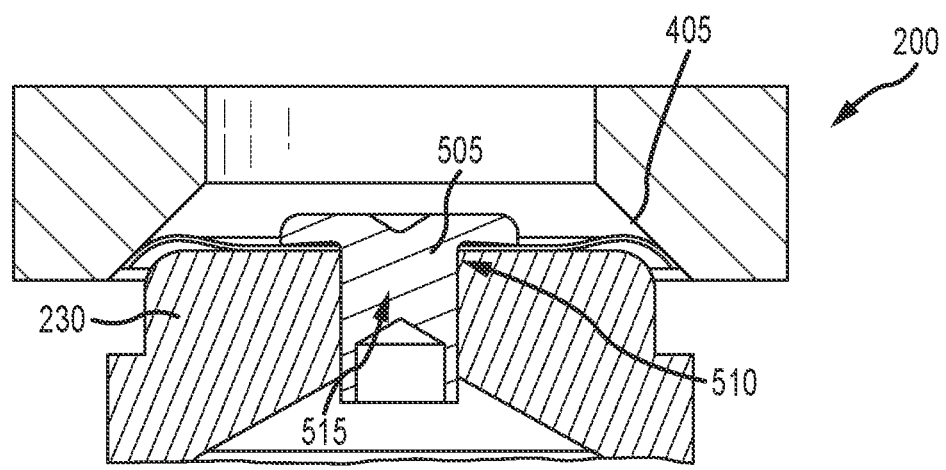

FIG. 5b shows another poppet 230 and resilient metal seal 405 from FIG. 4. In this case, the high pressure facing side 231 of the poppet 230 is provided with a bore 505. The resilient metal seal 405 similarly has an aligned bore 510. A fastener 515, such as a rivet, screw, pin, or the like, is used to couple the resilient metal seal 405 to the high pressure facing side 231 of the poppet 230 to form a fluid impervious seal between the resilient metal seal 405 and the poppet 230. As can be seen, the fastener 515 has a head that overlays the resilient metal seal 405 on the fluid facing side, which may facilitate the fluid impervious seal between the resilient metal seal 405 and the poppet 230.

Figure 6:
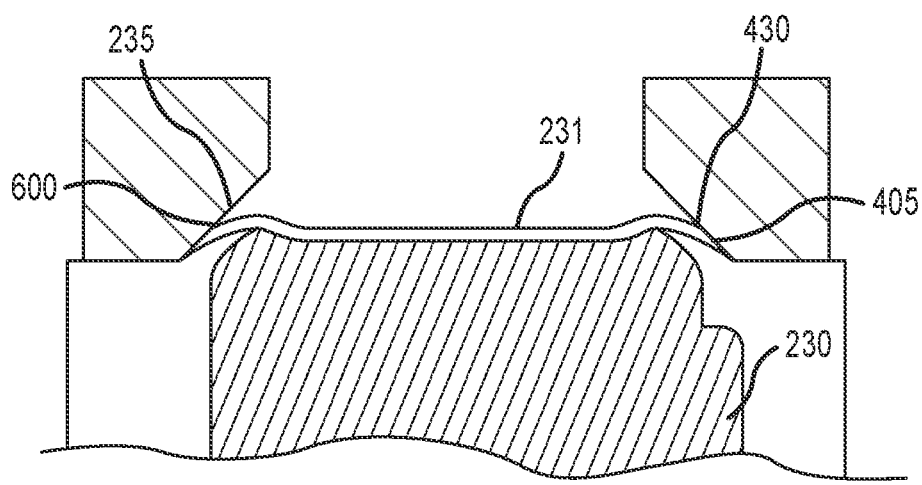
FIG. 6 shows a cross sectional view of a poppet, resilient metal seal, and valve seat consistent with the technology of the present application.

FIG. 6 shows another poppet 230 and resilient metal seal 405. In this case, the high pressure facing side 231 of the poppet 230 is formed with the resilient metal seal 405 forming an integral unit 600. When integral with the poppet 230, the resilient metal seal 405 forms an annular elastic member 600 extending from the high pressure facing side 231. The annular elastic member 600 has a curved or arc space such that it is pre-loaded to facilitate the seat interface 430.

FIGS. 1-7 show a one-way valve, such as a poppet style check valve, with the resilient metal seal coupled to the valve element or poppet. FIGS. 8-11 shows another embodiment of a one-way valve with the resilient metal seal coupled to the valve housing and/or valve seat contained in the valve housing.

Figure 8:
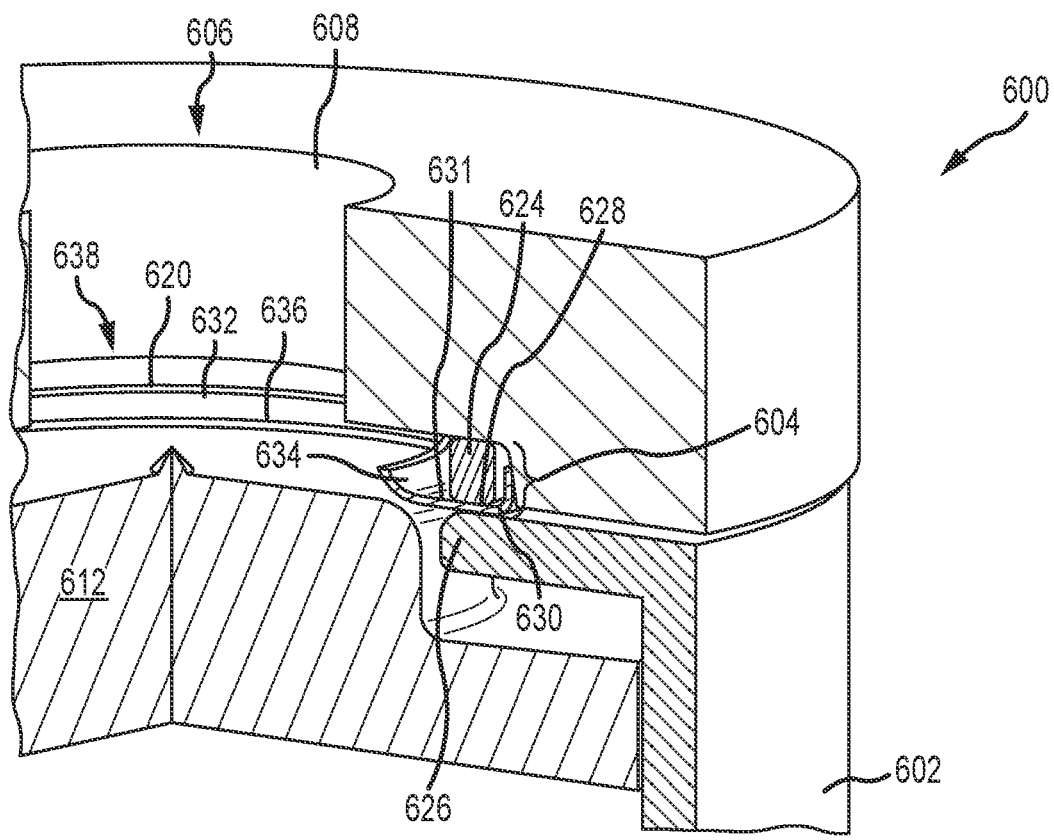
FIG. 8 shows a partial cross sectional view of another embodiment of a poppet check valve, resilient metal seal, and valve seat consistent with the technology of the present application.

FIG. 8 shows a partial cross sectional view of a one-way valve 600. The one-way valve 600 includes a housing 602 with a valve seat 604. The one-way valve has a through bore 606 with a reduced diameter portion 608 and a discharge portion (not shown in FIG. 8). A valve element 612 (or poppet 612) is contained and movable in the bore 606 from a seated or closed position to a lifted or opened position. An elastic member (not shown in FIG. 8) biases the valve element 612 towards the valve seat 604.

A resilient metal seal 620 is coupled to and extends radially inwardly from the valve seat 604. The valve seat 604, as shown, includes a base member 624 and a clamp member 626. An outer annular portion 628 (or outer portion 628) of the resilient metal seal 620 is clamped between the base member 624 and the clamp member 626. The outer perimeter 630 may be bent to wrap around the base member 624 as shown or the clamp member 626. The resilient metal seal 620 has an intermediate portion 631 extending from the outer portion 628 to an inner annular portion 632 (or inner portion 632). The intermediate portion 630 may be planar or undulating. The inner portion 632 has a curved portion 634 forming the seat or seal with the valve element 612 in the seated position. The inner portion 634 terminates at an inner edge 636 that forms a central aperture 638.

Figure 9:
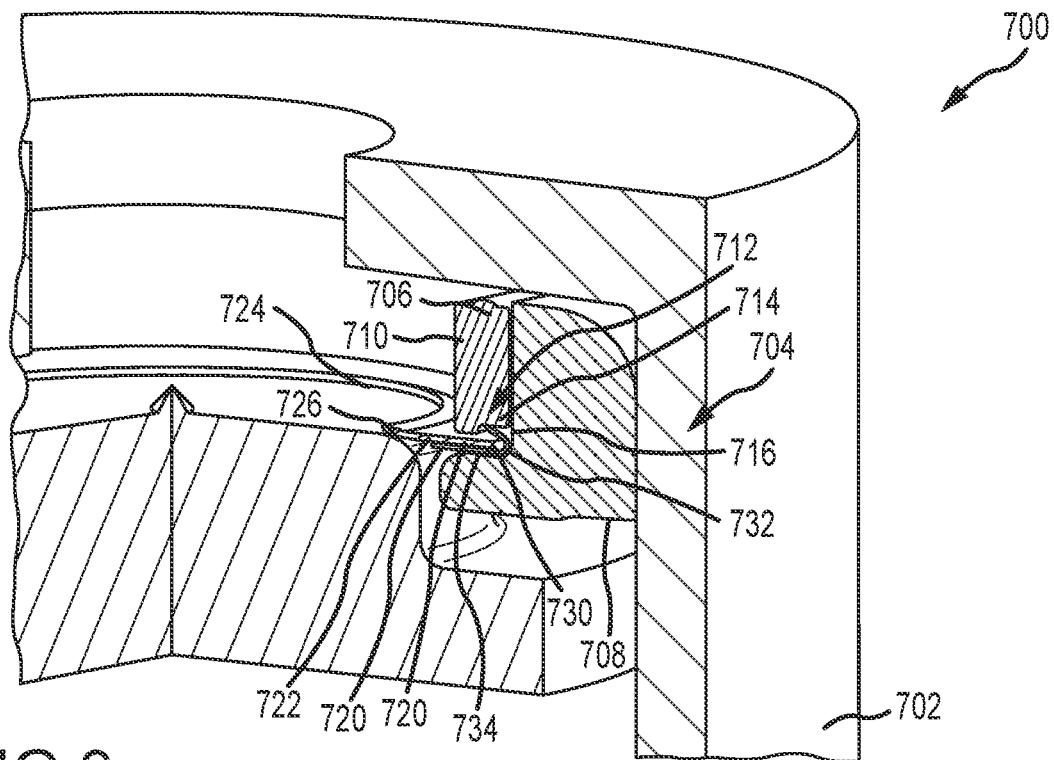
FIG. 9 shows a partial cross sectional view of another embodiment of a poppet check valve, resilient metal seal, and valve seat consistent with the technology of the present application.

FIG. 9 shows a partial cross sectional view of a one-way valve 700. The one-way valve 700 includes a housing 702 and a valve seat 704. The valve seat 704 includes a base member 706 and a clamp member 708. The base member 706 has a proximal side 710 and a distal side 712, which distal side 712 is downstream from the proximal side 710. The base member 710 has an outer annular notch 714 at the distal side 712. A recess 716 is formed by the notch 714 and the clamp member 708, which will be explained further below.

A resilient metal seal 718 has an outer annular portion 720, an intermediate annular portion 722, and an inner annular portion 724. In this example, the outer annular portion 720 and intermediate annular portion 722 form a planar surface and the inner annular portion 724 forms a curved seating or sealing surface 726. A retention clip 728 is shown with an upstream portion 730, a bend 732, and a downstream portion 734 are provided. The upstream portion 730 and the downstream portion 734 form an acute angle such that when seated, or closed, the bend 732 is under compression and the upstream portion 730 and downstream portion 734 hold the outer annular portion 720 of the resilient metal seal 718. The upstream portion 730 is sized to fit in the recess 716 above.

Figure 10:
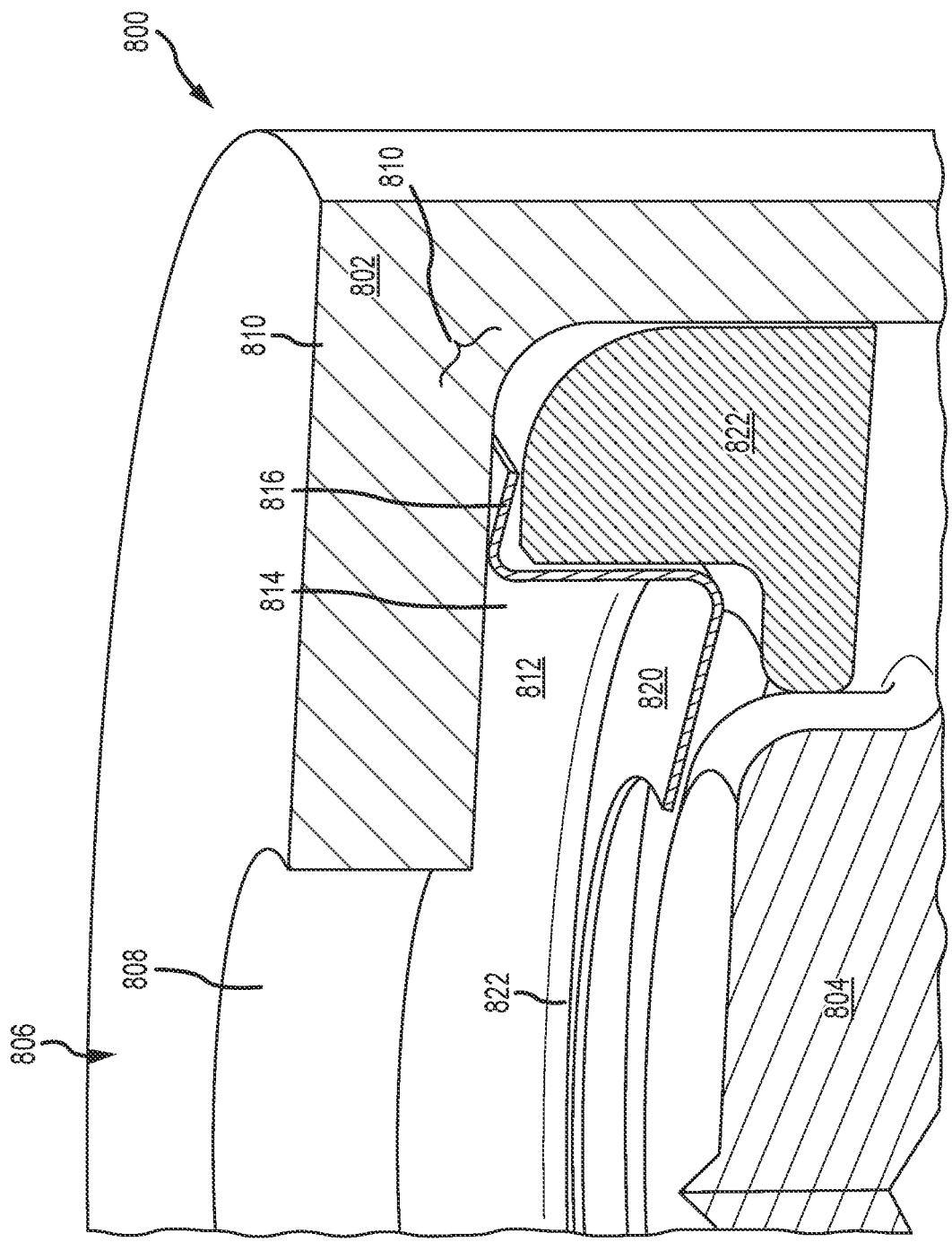
FIG. 10 shows a partial cross sectional view of another embodiment of a poppet check valve, resilient metal seal, and valve seat consistent with the technology of the present application.

FIG. 10 shows a partial cross sectional view of a one-way valve 800. The valve 800 has a housing 802 and a valve element 804, or poppet 804 in this exemplary embodiment, that is movable in a bore 806. The bore 806 has a reduced diameter portion 808 located upstream of the valve element 804. The seat 810 for the valve element 804 is formed from a resilient metal element 812. The resilient metal element 812 has a cylindrical sidewall 814, which could be any geometric shape. The cylindrical sidewall 814 extends in an axial direction along the bore 806. The cylindrical sidewall 814 has an upstream flanged portion 816 extending in a radially outward direction from cylindrical sidewall 814. The flanged portion 816 may be planar with a base 818 of the housing 802 forming a part of the seat 810. In some embodiments, the flanged portion 816 may be angled to preload the resilient metal element 812. The resilient metal element 812 also comprises a downstream flanged portion 820 extending in a radially inward direction from the cylindrical sidewall 814 and forming an aperture 822. The downstream flanged portion 820 may be planar, undulating, or curved to facilitate a seal interface between the downstream flanged portion 820 and the valve element 804. The seat 810 also comprises a clamp component 822 that clamps the upstream flanged portion 816 between the clamp component 822 and the base 818 of the seat 810. In certain embodiments, a rib (not shown) may be located on the base interior of the cylindrical wall 814 to support the downstream flanged portion 820 movement.

Figure 11:
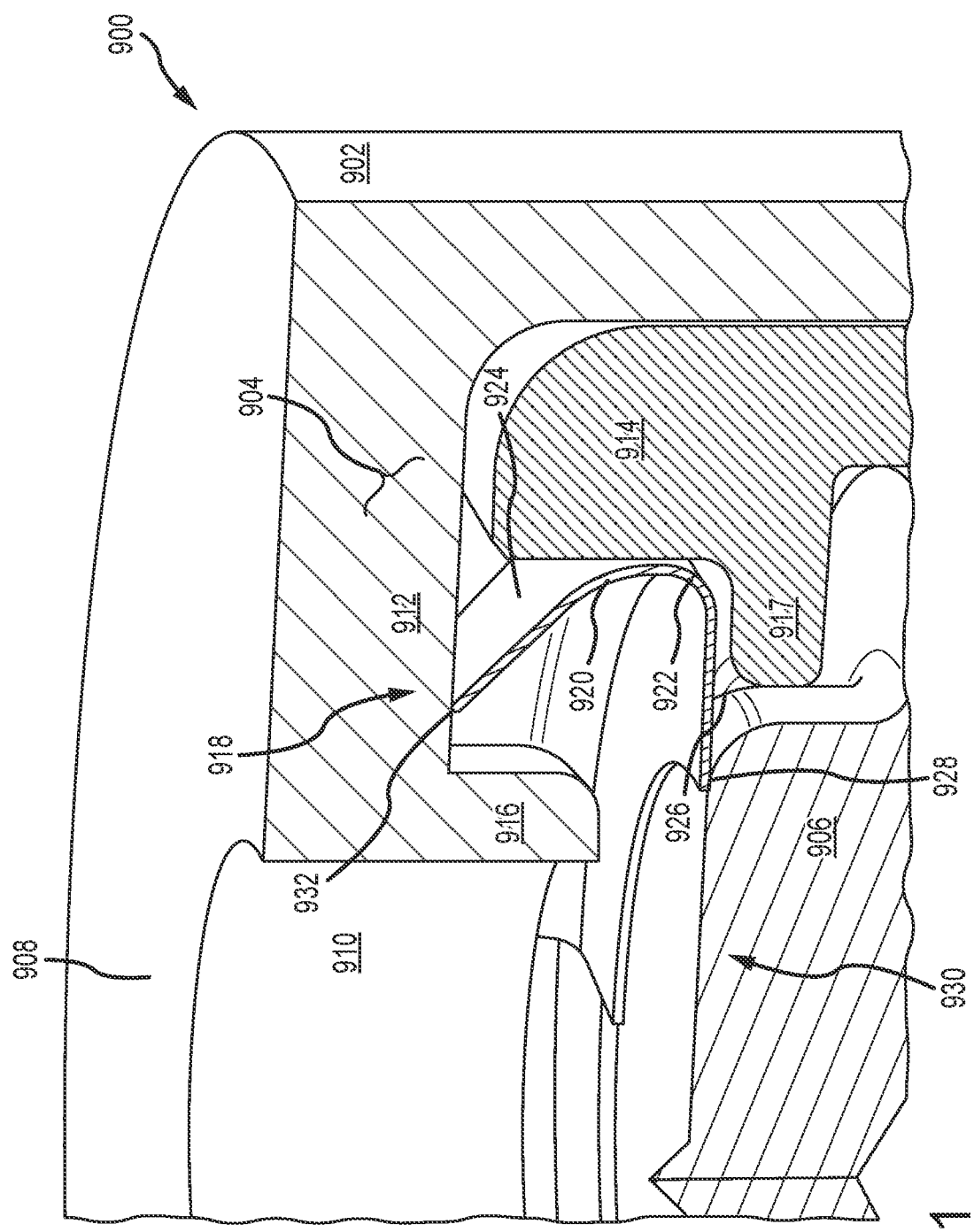
FIG. 11 shows a partial cross sectional view of another embodiment of a poppet check valve, resilient metal seal, and valve seat consistent with the technology of the present application.

FIG. 11 shows a one-way valve 900 that includes a housing 902 and a valve seal 904. The valve 900 includes a valve element 906, or poppet 906 in this exemplary embodiment, that is movable within a bore 908. The bore 908 may have a reduced diameter portion 910 upstream of the valve element 906. The valve seal 904 includes a base portion 912, which base portion 912 may be integral with the housing 902, a clamp portion 914, and a rib 916. The clamp portion 914 has a radially inwardly extending flanged shoulder 917. The rib 916 may be integral with the housing 902, or base portion 912, and extends axially from the base portion 912 towards the valve element 906. An outer sidewall of the rib 916, a surface of the base portion 912, an inner sidewall of the clamp portion 914, and a surface of the flanged shoulder 917 form a recess 918. The flanged shoulder 917 is axially separated in distance from the rib 916 such that the recess 918 is open to the bore 906.

The resilient metal seal 920 in this exemplary valve 900 is formed as a spring clamp or C spring member. The resilient metal seal 920 includes a bend 922, which preloads or biases the resilient metal seal 920 that has a first arm 924 extending in a radially inward and an axially upstream direction and a second arm 926 extending in a radially inward direction. The second arm 926 also may extend axially upstream or downstream, but is shown in this exemplary embodiment as extending radially inward only. The second arm 926 is shown as a planar surface, but may include undulations or a curve. The second arm 926 terminates at a seating interface 928 for the valve element 906, the seating interface 928 may be curved or flat as shown. The resilient metal seal 920 has a central aperture 930. The first arm 924 generally extends into the recess 918 and has a termination end 932 that engages the base portion 918. The termination end 932 may be rounded or curved to reduce frictional engagement with base 918. The rib 916 provides a stop such that when the valve element 906 engages the seating interface 928, the termination end 932 may move along the base portion 918 until the termination end 932 bumps the rib 916. The rib 916 also may provide a stop to inhibit the second arm 926 from over flexing when the valve element 906 engages the seating interface 928

Although the technology has been described in language that is specific to certain structures and materials, it is to be understood that the invention defined in the appended claims is not necessarily limited to the specific structures and materials described. Rather, the specific aspects are described as forms of implementing the claimed invention. Because many embodiments of the invention can be practiced without departing from the spirit and scope of the invention, the invention resides in the claims hereinafter appended. Unless otherwise indicated, all numbers or expressions, such as those expressing dimensions, physical characteristics, etc. used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques. Moreover, all ranges disclosed herein are to be understood to encompass and provide support for claims that recite any and all subranges or any and all individual values subsumed therein. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

What is claimed is:

1. A check valve comprising,
a valve housing having a bore;
a valve seat contained in the valve housing wherein the bore extends through the valve seat;
a valve element configured to selectively seat in the valve seat, the valve element having a high pressure facing side and a low pressure facing side, the valve element having a closed position and an opened position;
an annular channel extending around the valve seat formed by the valve housing, the valve seat, or a combination thereof;
an elastic member operatively engaged with the valve element to bias the valve element to engage the valve seat; and
a metal spring seal contained in the annular channel and operatively connected to the high pressure facing side of the valve element when the valve element is in the closed position, wherein the metal spring seal includes a seating interface for the valve element.

2. In a check valve having a housing, a valve seat, and a through bore, where the through bore has a first part upstream of the valve seat and a second part downstream of the valve seat, a valve element movable within the housing between a closed position and an open position, and an annular channel extending around the valve seat, an improvement comprising an elastic spring clamp in the annular channel configured to sealingly engage with the valve element when the valve element is in the closed position.

3. The check valve of claim 2, wherein the elastic spring claim is made from a metal.

4. The check valve of claim 2, wherein the elastic spring clamp is a C shaped spring member.

5. The check valve of claim 4, wherein the elastic spring clamp is formed from metal.

6. The check valve of claim 4 wherein the C shaped spring member comprises bend coupling a first arm that extends radially inward and axially upstream and a second arm extending radially inwardly.

7. The check valve of claim 6 wherein the second arm extends axially upstream.

8. The check valve of claim 6 wherein the second arm extends axially downstream.

9. The check valve of claim 4 wherein the second arm is undulating.

10. The check valve of claim 4 wherein the second arm extending radially inward terminates at a seating interface.

11. The check valve of claim 10 wherein the seating interface is curved.

12. In a one way valve having a housing, a valve seat, and a through bore, where the through bore has a first part upstream of the valve seat and a second part downstream of the valve seat, a valve element movable within the housing between a closed position and an open position, and an annular channel extending around the valve seat, the improvement comprising a metal means for sealing configured to reside in the annular channel and configured to sealingly engage with the valve element when the valve element is in the closed position.

13. The one way valve of claim 12 wherein the metal means for sealing comprises a metal spring clip.

14. The one way valve of claim 13 wherein the metal spring clip comprises a bend coupling a first arm that extends radially inward and axially upstream and a second arm extending radially inwardly wherein the bend is biased to cause the first arm and the second arm to diverge.

15. The one way valve of claim 14 wherein the metal spring clip forms a C shape.

16. The one way valve of claim 14 wherein the second arm that extends radially inward terminates in a sealing interface.

17. The one way valve of claim 16 wherein the sealing interface is a curved surface configured to preload the sealing interface.

* * * * *